United States Patent [19]

Jones

[11] Patent Number: 4,912,691
[45] Date of Patent: Mar. 27, 1990

[54] VIDEO STABILIZER

[76] Inventor: Raymond Jones, 210 King Phillip's Pathe, Marshfield, Mass. 02050

[21] Appl. No.: 227,095

[22] Filed: Aug. 1, 1988

[51] Int. Cl.$^4$ .......................... H04N 5/76; H04N 5/93
[52] U.S. Cl. ........................................ 380/5; 358/335; 360/37.1; 380/15
[58] Field of Search ............... 358/319, 335, 153, 154, 358/174; 360/37.1, 60; 380/5, 15

[56] References Cited

U.S. PATENT DOCUMENTS

| | | | |
|---|---|---|---|
| 3,517,127 | 6/1970 | Grace | 360/37.1 |
| 4,382,098 | 4/1989 | Smeulers | 358/153 |
| 4,631,603 | 12/1986 | Ryan | 360/37.1 |
| 4,695,901 | 9/1987 | Ryan | 380/5 |
| 4,789,896 | 12/1988 | Kishi et al. | 358/154 |

Primary Examiner—Donald McElheny, Jr

[57] ABSTRACT

This invention is directed at a video stabilizer which removes non standard AGC pulses added to a video signal for inhibiting the making of acceptable video recordings of the video signal which includes filtering out the horizontal synchronizing signals form the composite synchronization signal, while passing the vertical synchronizing signal; differentiating the vertical synchronizing signals; applying the differentiated signal to a first electronic device; turning the first electronic device off at the end of the vertical synchronizing signal and charging the first capacitor providing a first ramp voltage; applying the first ramp voltage to a first pair of comparator amplifiers; applying the output signal of the first pair of comparator amplifiers to a first amplifier shunting a poriton of the output signal through a first diode array and the remaining portion of the output signal to charging a second capacitor providing a second ramp voltage; the second ramp voltage being applied to a second amplifier; the output of the second amplifier being applied to a second diode array; and then clamping the output of a second electronic device to 0.4 of a volt.

4 Claims, 1 Drawing Sheet

VIDEO STABILIZER

BACKGROUND OF THE INVENTION

This invention relates generally to a method and apparatus for attenuating AGC pulses added to a video signal for the purposes of inhibiting copying of the video signal.

SUMMARY OF THE INVENTION

The invention disclosed herein comprises an apparatus and a method of removing non standard AGC pulses added to a video signal for inhibiting the making of acceptable video recordings of the video signal comprising the steps of filtering out the horizontal synchronizing signals from the composite synchronization signal, while passing the vertical synchronizing signal; differentiating the vertical synchronizing signals; applying the differentiated signal to a first electronic device with the first electronic device functioning as a switch, turning on and discharging a first capacitor; turning the first electronic device off at the end of the vertical synchronizing signal and charging the first capacitor providing a first ramp voltage; applying the first ramp voltage to a first pair of comparator amplifiers; applying the output signal of the first pair of comparator amplifiers to a first amplifier shunting a portion of the output signal through a first diode array and another portion of the output signal to charging a second capacitor providing a second ramp voltage; the second ramp voltage being applied to a second amplifier; the output of the second amplifier being applied to a second diode array; clamping the output of a second electronic device to 0.4 of a volt; applying the original video signal to the second electronic device thereby clamping out of the circuit disruptive signals.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
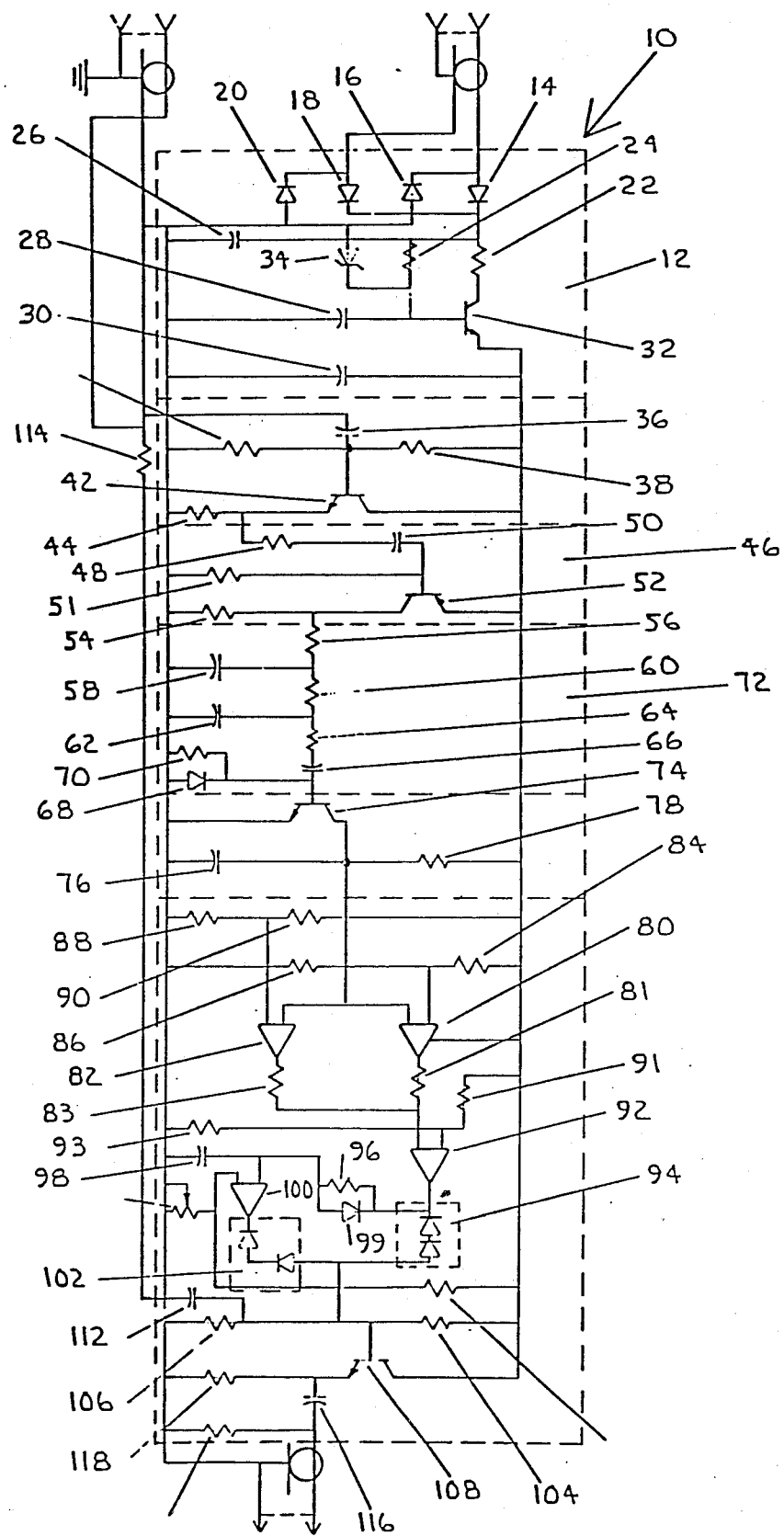
FIG. 1 is a schematic of an apparatus according to the present invention.

There is shown in the drawings a video stabilizer 10 comprising a power supply 12 which includes the diodes 14, 16, 18, 20; the resistors 22, 24; the capacitors 26, 28, 30 and the transistor 32. the power supply 12 is a filtered emitter follower in which the voltage at the emitter of the transistor 32 is equal to the voltage at junction between resistor 24 and the diode 34. That voltage is stabilized and current multiplication occurs through the transistor 32. The power supply 12 supplies a regulated 9 volts to operate the rest of the system.

The capacitor 36, the resistor 38, the resistor 40, the transistor 42 and the resistor 44 combine to form an emitter follower amplifier 46 which operates as the video input buffer The purpose of these components is to isolate the incoming video signal from the rest of the circuitry and to provide a source of low impedance video. The video input comes from any video source. This may be the output of a tuner, output of a video recorder, etc. The purpose of the capacitor 36 is to couple that signal into the amplifying transistor 42. The resistors 38, 40 bias the transistor 42 so that it is electrically positioned above ground sufficiently to provide the correct amplitude of swing. The resistor 44 acts as a load across which the video signal is developed. The signal across resistor 44 is picked off by the resistor 48, the capacitor 50 and the transistor 52. The transistor 52, and its associated components including the resistor 51 function to pick the synchronizing signals (composite sync signals) off of the video signal. A series of synchronizing sync signals) exist in the video signal to synchronize both vertical and horizontal scan. Those composite sync signals appear across the load resistor 54. The resistor 56, capacitor 58, resistor 60, capacitor 62 make up a two stage low pass filter 72. The function of the low pass filter 72 is to extract the vertical synchronization signal from the composite synch signals. The vertical synchronization signal has a longer period than the horizontal synchronization signals, representing a lower frequency component. The low pass filter therefore filters out the horizontal synchronization signal while passing the vertical synchronization signal.

The resistor 64, capacitor 66, diode 68 and the resistor 70 differentiate the signal and apply that signal to the base of transistor 74 which functions as a switch turning on briefly discharging capacitor 76, which is connected across its collector to ground. As soon as transistor 74 turns off again at the end of the vertical synchronization signal, the resistor 78 acts to charge capacitor 76 and to form a ramp voltage. The ramp voltage is applied to the input of two comparator amplifiers 80, 82. The amplifier 80 is biased by resistors 84, 86 and the amplifier 82 is biased by resistors 88, 90. When both comparator amplifiers 80, 82 assume the appropriate state, which is at a mid-point during the vertical reset interval sometime after the start of the interval but before its termination. The resulting composite signal is applied to the amplifier 92, through resistors 81, 83, which functions as a switch momentarily shunting a portion of the signal through the diode array 94 when the bias determined by resistors 91 and 93 is exceeded When the amplifier 92 goes into conduction, the signal is applied through the resistor 96 to the capacitor 98 forming a second ramp voltage. The second ramp voltage is applied to the amplifier 100 which also acts as a comparator. The second ramp voltage produces a second timing signal for removal for what is called the "back porch" portion of the signal. The back porch being the signal that occurs just prior the vertical reset interval. The output of the amplifier 100 is applied to the second diode array 102 and functions the same as the amplifier 92. Diode 99 provides a path for rapid reaction of capacitor 98 during the vertical internal pulse.

Going to the output stage made up of resistor 104, resistor 106 and transistor 108, functioning as an emitter buffer video amplifier 110. The transistor 108 derives its signal from the original video signal through resistor 114 through capacitor 112. The resistor 114 and capacitor 112 feed the signal to the base of transistor 108 and under normal circumstances normal TV video appears at the output of transistor 108 across the load resistor 118 through capacitor 116 to the receiving source of video, for example a monitor, a recorder, etc. The only modification to the video signal occurs during the time when the comparators 92 or 100 are satisfied and diode array 94 or the second diode array 102 are brought to ground by their respective switch. During that time the maximum output of transistor 108 is clamped to 0.4 of a volt. This is accomplished by dropping the remaining portion of the video signal across resistor 114. So the maximum AC portion of the video signal that is available at the emitter of transistor 108 is clamped to 0.4 volt. Any signal that exceeds 0.4 of a volt is attenuated to 0.4 of a volt. This means that Color sync signals, signals that are impressed on the video for purpose of closed captioning, or other information that is impressed in the header pass unchanged. Those signals which are disruptive (ie. more highly white than whiter than white) are clamped out of the circuit. The video stabilizer disclosed herein may be utilized by itself or in combination With any video source.

What I claim is:

1. A method of removing non standard AGC pulses added to a video signal for inhibiting the making of acceptable video recordings of the video signal comprising the steps of:
   filtering out the horizontal synchronizing signals from the composite synchronization signal, while passing the vertical synchronizing signal;
   differentiating the vertical synchronizing signals;
   applying the differentiated signal to a first electronic device;
   the first electronic device functioning as a switch, turning on and discharging a first capacitor;
   turning the first electronic device off at the end of the vertical synchronizing signal and charging the first capacitor providing a first ramp voltage;
   applying the first ramp voltage to a first pair of comparator amplifiers;
   applying the output signal of the first pair of comparator amplifiers to a first amplifier shunting a portion of the output signal through a first diode array and the remaining portion of the output signal to charging a second capacitor providing a second ramp voltage;
   the second ramp voltage being applied to a second amplifier;
   the output of the second amplifier being applied to a second diode array;
   clamping the output of a second electronic device to 0.4 of a volt;
   applying the original video signal to the second electronic device thereby clamping out of the circuit disruptive signals.

2. A method of attenuating AGC pulses added to a video signal for inhibiting the making of acceptable video recordings of the video signal comprising the step of:
   clamping the video signal at 0.4 of a volt thereby clamping out of the signal circuit disruptive signals.

3. The method as set forth in claim 2 further comprising the first step of:
   filtering out the horizontal synchronizing signals from the composite synchronization signal, while passing the vertical synchronizing signal.

4. An apparatus for removing non standard AGC pulses added after normal AGC pulses to a video signal for inhibiting the making of acceptable video recordings of the video signal comprising:
   a. An emitter follower amplifier which operates as the video input buffer;
   b. Means for picking the synchronizing signals (composite sync signals) off of the video signal;
   c. A two stage low pass filter for extracting the vertical synchronization signal from the composite sync signals;
   d. A combination of electronic components for differentiating the signal and applying that signal to the base of a first transistor which functions as a switch turning on briefly and discharging a first capacitor connected across the collector of the first transistor to ground;
   e. a first resistor acting to charge the first capacitor and to form a first ramp voltage;
   f. The first ramp voltage being applied to the input of first and second comparator amplifiers which at a predetermined point apply the resulting composite signal to a third amplifier, which functions as a switch momentarily shunting a portion of the signal through a first diode array,
   g. When the third amplifier goes into conduction, a portion of the signal is applied to a second capacitor forming a second ramp voltage;
   h. The second ramp voltage is applied to a fourth comparator amplifier producing a second timing signal for removal of what is called the "back porch" portion of the signal;
   i. The output of the fourth comparator amplifier being applied to the second diode array shunting a portion of the signal;
   j. input means for inputting an original video signal to an emitter buffer video amplifier including a second transistor through a second resistor and through a third capacitor;
   k. The second resistor and the third capacitor feed the signal to the base of the second transistor;
   l. and a video signal appears at the output of second transistor across a load resistor through a fourth capacitor to a receiving source for the video signal.

* * * * *